United States Patent [19]

Obata et al.

[11] Patent Number: 4,988,524

[45] Date of Patent: Jan. 29, 1991

[54] METHOD FOR PROCESSING RAW MEAT BY USE OF AN OIL AND FAT EMULSION

[75] Inventors: Koichi Obata; Yoshihiko Noriuchi, both of Chofu, Japan

[73] Assignee: Wakodo Co., Ltd., Tokyo, Japan

[21] Appl. No.: 424,895

[22] Filed: Oct. 20, 1989

[30] Foreign Application Priority Data

Nov. 2, 1988 [JP] Japan .................................. 63-278268

[51] Int. Cl.$^5$ .............................................. A23L 1/318
[52] U.S. Cl. ...................................... 426/281; 426/657
[58] Field of Search ................................. 426/281, 657

[56] References Cited

U.S. PATENT DOCUMENTS 4,358,465 11/1982 Brule et al. ......................... 426/657

Primary Examiner—Donald E. Czaja
Assistant Examiner—Helen Pratt
Attorney, Agent, or Firm—Frishauf, Holtz, Goodman & Woodward

[57] ABSTRACT

Disclosed is an oil and fat emulsified product, comprising an oil and fat which is solid at normal temperature and emulsified by use of a casein alkali salt decomposed with a milk coagulating enzyme. Disclosed is also a method for processing raw meat, which comprises injecting an aqueous mixture of the oil and fat emulsified product in the above and calcium ions into raw meat tissue, followed by coagulation and fixing of the emulsion.

10 Claims, No Drawings

METHOD FOR PROCESSING RAW MEAT BY USE OF AN OIL AND FAT EMULSION

BACKGROUND OF THE INVENTION

This invention relates to an oil and fat emulsified product for processing raw meat by injecting and fixing the oil and fat emulsified product into raw meat for food to change its appearance into marbled one and improve its taste, and also to a method for processing raw meat.

Prior attempts to improve taste of raw meat by mixing an appropriate amount of oil and fat into raw meat which is tough and hard to masticate can be found in, for example, the method in which an emulsified aqueous solution having an oil and fat emulsified with a protein having heating coagulatability is formulated in meat tissue, followed by heating treatment at the heating coagulation temperature of said protein or higher to fix the emulsion in the tissue as disclosed in Japanese Patent Publication No. 34377/1987, or the method in which a gelling agent such as gelatin is formulated into an emulsified aqueous solution having an oil or fat emulsified with a protein, injected into meat tissue and fixing the emulsion into the meat tissue with the gelling agent, etc. According to the former method, since the emulsified product cannot be fixed under raw meat state, the object cannot be achieved at normal temperature. According to the latter method, since solidification and melting of the gelling agent (gelatin) has reversibility depending on the temperature, it has the drawbacks such that the emulsion may be flowed out from meat tissue in the cooking process, or that meat tissue may be formed into jelly with the gelling agent to impair its inherent organoleptic property.

SUMMARY OF THE INVENTION

An object of the present invention is to improve raw meat by injecting and fixing an oil or fat of appropriate quality and oil-soluble nutrients and seasonings into raw meat tissue at low temperature, with the fixed product being irreversible at any temperature, to change the appearance into marbled one and soften the tissue to give raw meat which is soft and excellent in masticatability, and also without impairment of good flavor and organoleptic property possessed by raw meat.

The present inventors have invented an oil or fat emulsified product of which solution is coagulated momentarily at conventional temperature for raw meat handling and pH inherent in raw meat, and accomplished the object by injecting the emulsified product into raw meat tissue and fixing it uniformly and densely.

More specifically, the present invention is an oil or fat emulsified product, comprising an oil or fat which is solid at normal temperature and emulsified by use of a casein alkali salt decomposed with a milk coagulating enzyme, and a method for processing raw meat, which comprises injecting an aqueous mixture of the oil or fat emulsified product and calcium ions into raw meat tissue, followed by coagulation and fixing of the emulsion.

DESCRIPTION OF THE PREFERRED EMBODIMENT

The present invention will be described in detail hereinbelow.

The casein alkali salt is a casein sodium salt or potassium salt, and is prepared by addition of an alkali hydroxide or an alkali carbonate into casein. For the milk coagulating enzyme, rennet (rennin) derived from animals or rennet derived from microorganisms can be used. For decomposition of an casein alkali salt with rennet, after permitting rennet (17,000 Soxhlet units or more of milk coagulating enzyme used per 100 g of the casein alkali salt solid) to act on a 5 to 15% aqueous solution of a casein alkali salt at 30° to 35° C., pH 5.8 to 6.2, for 20 to 40 minutes, the enzyme is deactivated by maintaining at 80° C. for 20 to 30 minutes. The decomposed casein decomposed with a milk coagulating enzyme thus obtained (hereinafter called decomposed casein), when observed by starch gel electrophoresis, has κ-casein decomposed and disappeared, with 5% trichloroacetic acid soluble N of the total N being 5.0 to 5.5%. Thus, the decomposed casein is clearly different from the starting material casein alkali salt. The pH is 6.0 to 6.2.

The oil or fat emulsified product of the present invention is prepared by emulsifying an animal or vegetable oil and fat having a melting point of 25° C. or higher, such as tallow, lard, milk fat, coconut oil, palmkernel oil, cacao fat, or mixed oils of these or hydrogenated oils and fats, in conventional manner with the use of the above decomposed casein as the protective colloid. The formulation ratio may be appropriately 10 to 50 parts by weight of the decomposed casein per 100 parts by weight of the oil and fat. If it is less than 10 parts by weight, no emulsification can be fully effected, while over 50 parts by weight, the protein becomes excessive to give a hard reaction product, whereby the object cannot be accomplished. The emulsified product thus obtained can be spray dried into powdery emulsified product, which is the desired product of the present invention.

When calcium ions are added in an appropriate amount into an aqueous solution of the above oil or fat emulsified product, the turbid solution will not change with lapse of time at 1° to 10° C. even though it is left to stand for 2 hours, but it is slightly thickened at 10° to 13° C., and momentarily coagulated into a sol at 13° to 15° C., without change in coagulated state even heated to 15° C. or higher, and the coagulated product formed has the characteristic that it is irreversible relative to cooling - heating and unchanged depending on pH. As the calcium ion, an aqueous solution of a soluble calcium compound, preferably calcium chloride, may be suitably used.

The reaction between the oil or fat emulsified product and calcium ions may be carried out by, for example, dissolving 100 parts by weight of the emulsified product powder obtained by adding 10 parts by weight of a decomposed casein to 100 parts by weight of an oil or fat with addition of an equal amount of water to form a solution of the emulsified product, and adding calcium ions thereinto in an amount preferably of 1 to 5 parts by weight per 100 parts by weight of the decomposed casein. If the amount is less than 1 part by weight, the reaction is too slow to accomplish fully the object, while if it is more than 5 parts by weight or more, the coagulated product formed is too hard to accomplish the object.

The raw meat processing method of the present invention utilizes the property of the oil or fat emulsified product of the present invention as described above, and comprises injecting a mixed aqueous solution of the oil or fat emulsified product and calcium ions into raw meat tissue at not higher than 10° C. to be thoroughly dispersed into the tissue and coagulating and fixing the aqueous emulsified product solution at a temperature of 13° to 15° C. at which no change of raw meat will occur. And, the state of the raw meat thus processed is unchanged even in secondary processing (cooking at 15° to 100° C.), and also the raw meat thus processed can be cooled, refrigerated, frozen without change. Further, since the pH of the raw meat thus processed is unchanged from that of the raw meat, it will not affect the color tone, flavor, muscle tissue inherent in raw meat.

The method for injecting a mixed aqueous solution of the oil or fat emulsified product and calcium ions into meat tissue may be suitably the known vascular injection method, the intramuscular injection method, and as the means for dispersing uniformly the solution into meat tissue, the known tumbling method and the massage method may be suitably employed. As the raw meat, domestic animal meats such as cattle, pig, sheep, chicken, rabbit may be available.

The raw meat processing method of the present invention can disperse and fix the oil or fat emulsified product into meat tissue at a temperature of 13° to 15° C. as described above, and therefore the object can be accomplished while maintaining freshness of raw meat. Also, according to the raw meat processing method of the present invention, the following improvements have been rendered possible.

(1) By injecting and fixing an oil or fat of suitable quality in an amount depending on the purpose into a raw meat which is tough and poor in masticatability, it can be improved into a soft raw meat excellent in masticatability.

(2) By injecting and fixing white emulsified product into red meat, said oil or fat emulsified product is fixed with the tissue cross-section being in shape of marble to change the appearance to marbled one, and also change the taste at the same time.

(3) By injecting and fixing a different kind of oil or fat into said raw meat, a raw meat with a novel flavor is formed.

(4) By injecting and fixing an oil or fat in which oil-soluble nutrients (tocopherol, EPA, carotin, etc.) are melted into said raw meat, a nutritionally excellent raw meat is formed.

(5) By injecting and fixing an oil or fat in which oil-soluble seasonings (pepper oil, etc.) are added into said raw meat, a novel seasoned raw meat is formed.

EXAMPLE 1

Into 100 parts by weight of hot water of 80° C., 20 parts by weight of a decomposed casein were added and completely dissolved therein to make an aqueous decomposed casein solution. Into a liquid of 100 parts by weight of purified tallow melted to 60° C., the above aqueous decomposed casein solution was added under stirring by a homomixer for 15 minutes to obtain 220 parts by weight of a preliminary emulsion. The liquid temperature was made 65° C., and emulsified completely by Manthon Gaulin homogenizer (60 Kg/cm$^2$) to obtain an emulsion. An aqueous 3.5% calcium chloride solution was added in an amount of 12 parts by weight per 100 parts by weight of the emulsion (fat content: 45.5% solution) at 5° C., followed by mixing, to obtain an injection solution.

One hundred parts by weight of meat mass of beef fillet with a fat content of 7.0% was adjusted to a temperature of 5° C. and 30 parts by weight of the above injection solution were injected according to the conventional intramuscular injection method by means of DICK BRINE PUMP (produced by Friedr Dick GmbH) to make treated meat.

After the product temperature of the treated meat reached 20° C., the untreated control product and the present product were frozen to −20° C.

Five days later, they were taken out, thawed, cut and evaluated in conventional manners, and also subjected to cooking evaluation. The results are shown in Table 1.

TABLE 1

|  | Present product | Control |
|---|---|---|
| Evaluation of raw meat: |  |  |
| Situation of cut surface: | Emulsified product dispersed and fixed in marble without change of red meat tone | Situation of red meat |
| Flavor: | Good flavor with smell of beef tallow | Only smell of red meat |
| pH: | 5.6 | 5.4 |
| Cooking evaluation: |  |  |
| Situation when baked in steak on fry pan under the same conditions: | Good smell with smell of beef tallow and soft teeth feeling, easily masticatable delicious steak | Only smell of red meat, tough teeth feeling, tough and hardly masticatable steak |

EXAMPLE 2

Into 100 parts by weight of hot water of 75° C. were added 10 parts by weight of a decomposed casein to be completely dissolved therein to make an aqueous decomposed casein solution. To a liquid of 100 parts by weight of butter oil melted at 65° C., 0.2 part by weight of almond oil as a perfume and 3000 I.U. of oily vitamin A fatty acid ester were added and dissolved by mixing.

Into 110 parts by weight of the aqueous decomposed casein solution (60° C.), 100 parts by weight of the mixed and melted butter oil (60° C.) were added and preemulsified in conventional manner under stirring by means of a homomixer.

The liquid temperature of 100 parts by weight of the preemulsified mixture was adjusted to 65° C., and completely emulsified by Manthon Gaulin homogenizer (80 Kg/cm$^2$) to obtain an emulsified solution. After 100 parts by weight of the emulsified solution were adjusted to 7° C., 10 parts by weight of 3.5% aqueous calcium chloride solution were added and mixed to obtain an injection solution.

One hundred parts by weight of meat mass of pork shoulder with a fat content of 2.6% were adjusted to 7° C., and 25 parts by weight of the injection solution were injected according to the so-called intramuscular injection method by means of DICK BRINE PUMP (produced by Friedr Dick GmbH), treated at a product temperature of 10° to 12° C. according to the conventional massaging method for 30 minutes to have the injection solution uniformly dispersed into the meat tissue. Then, after the product temperature of the treated meat was elevated to 15° C., it was frozen to −20° C. and thawed after one day to provide a novel raw meat. A novel processed pork raw meat having the almond and butter flavor and strengthened in vitamin A was obtained.

REFERENCE EXAMPLE 1

(Preparation of rennin decomposed casein sodium)

An amount 175 parts by weight of casein sodium was dissolved in 3,300 parts by weight of hot water of 65° C. to obtain an aqueous 5% casein sodium solution, which was then adjusted to pH 6.0 with addition of 1% HCl solution.

The rennin solution was prepared by dissolving 6 parts by weight of sodium chloride and 1 part by weight of rennet powder HA-LA (produced by Christian Hansen Co.) into 193 parts by weight of water of 15 ° C.

To 3,475 parts by weight of the casein sodium solution prepared of 30° C. were added 25 parts by weight of the rennin solution, permitted to act at 30° C. for 20 minutes to decompose casein sodium, and then the liquid temperature was maintained at 80° C. for 10 minutes to deactivate the added enzyme.

The aqueous solution of the decomposed product was spray dried in conventional manner to obtain a rennin decomposed casein sodium.

REFERENCE EXAMPLE 2

(Preparation of microorganism rennet decomposed casein potassium)

An aqueous 10% casein potassium was prepared by dissolving 350 parts by weight of casein potassium in 3,125 parts by weight of hot water of 70° C., and the pH was adjusted to 6.0 with addition of 1% HCl solution.

The microorganism rennet solution was prepared by dissolving 13 parts by weight of a microorganism rennet (Microorganism rennet manufactured by Meito) in 1,000 parts by weight of water of 20° C.

Into 3,475 parts by weight of an aqueous casein potassium solution of 30° C. were added 17.5 parts by weight of the microorganism rennet solution (33,000 Soxhlet units/100 g casein sodium) to decompose the casein potassium at 35° C. for 25 minutes, followed by keeping of the mixture at 80° C. for 15 minutes to deactivate the enzyme.

The decomposed aqueous casein solution was spray dried in conventional manner to obtain microorganism rennet decomposed casein potassium powder.

We claim:

1. A method for processing raw meat, which comprises injecting an emulsified aqueous mixture comprising an oil or fat which is solid at normal temperature and emulsified with a casein alkali salt decomposed with a milk coagulating enzyme; and calcium ion, into raw meat tissue, followed by coagulation and fixing of the emulsion.

2. The method for processing raw meat according to claim 1, wherein the calcium ion is a soluble calcium compound.

3. The method for processing raw meat according to claim 2, wherein the calcium ion is calcium chloride.

4. The method for processing raw meat according to claim 1, wherein the calcium ion is formulated in an amount of 1 to 5 parts by weight to 100 parts by weight of the decomposed casein.

5. The method for processing raw meat according to claim 1, wherein the aqueous mixture is injected into raw meat tissue at 10° C. or less.

6. The method for processing raw meat according to claim 1, wherein the coagulation and fixing of the emulsion is carried out at 13° C. or more.

7. The method for processing raw meat according to claim 1, wherein the coagulation and fixing of the emulsion is carried out at the temperature within the range of 13° C. to 15° C.

8. The method for processing raw meat according to claim 1, wherein further comprises dispersing uniformly the injected aqueous mixture into the raw meat tissue at 10° to 12° C.

9. The method for processing raw meat according to claim 1 wherein the oil or fat has a melting point of 25° C. or higher and is tallow, lard, milk fat, coconut oil, palm kernel oil, cocoa fat, or mixtures thereof.

10. The method for processing raw meat according to claim 1 wherein the oil or fat is a hydrogenated vegetable or animal oil or fat having a melting point of at least 25° C.

* * * * *